United States Patent [19]

Kimura et al.

[11] 4,255,544
[45] Mar. 10, 1981

[54] PROCESS FOR POLYMERIZATION OF ETHYLENE

[75] Inventors: Akio Kimura; Satoshi Asahi, both of Sodegaura, Japan

[73] Assignee: Idemitsu Kosan Co., Ltd., Tokyo, Japan

[21] Appl. No.: 134,759

[22] Filed: Mar. 28, 1980

[30] Foreign Application Priority Data

Apr. 9, 1979 [JP] Japan .................. 54-42043

[51] Int. Cl.$^3$ ................ C08F 4/02; C08F 10/02
[52] U.S. Cl. ................ 526/124; 252/429 B; 252/429 C; 526/127; 526/352
[58] Field of Search ........................ 526/124

[56] References Cited

U.S. PATENT DOCUMENTS

| | | | |
|---|---|---|---|
| 4,071,672 | 1/1978 | Kashiwa | 526/127 |
| 4,115,319 | 9/1978 | Scata et al. | 526/124 |
| 4,144,390 | 3/1979 | Derroitte et al. | 526/124 |

FOREIGN PATENT DOCUMENTS 1357474  6/1974  United Kingdom ............ 526/124

Primary Examiner—Edward J. Smith
Attorney, Agent, or Firm—Frishauf, Holtz, Goodman & Woodward

[57] ABSTRACT

Ethylene is polymerized in the presence of a catalyst comprising: (A) the reaction product of a magnesium compound and titanium halide and (B) an organic aluminum compound wherein Component A is prepared by reacting magnesium dialkoxide with a halogen-containing silicon compound and an alcohol to provide a solid material and then reacting the solid material with titanium halide in the presence of an alkoxy-containing silicon compound.

7 Claims, No Drawings

PROCESS FOR POLYMERIZATION OF ETHYLENE

BACKGROUND OF THE INVENTION

1. Field of the Invention

This invention relates to a process for polymerization of ethylene and more particularly to a process for efficiently polymerizing ethylene by use of a novel ethylene polymerization catalyst.

2. Description of the Invention

As is known in the art, the material obtained by reacting a magnesium-containing compound used as a carrier, such as a magnesium halide, magnesium alkoxide, etc. with a titanium halide constitutes a component of a highly active catalyst for polymerization of ethylene.

Japanese Patent Publication No. 34098/1971 discloses in detail the use of the reaction product of a magnesium alkoxide and a titanium halide as a catalyst component. With this catalyst component, however, unsatisfactory catalyst activity and polyethylene of the desired quality are not obtained. Therefore, various methods have been proposed to obtain improved results. For example, Japanese Patent Publication No. 30118/1976 and Japanese Patent Application Laid-open (Kokai) No. 144490/1979 disclose a method in which magnesium alkoxide, after being treated with a halogenating agent, is reacted with a titanium compound, and Japanese Patent Publication No. 30118/1976, Japanese Patent Application Laid-open (Kokai) Nos. 98076/1977 and 2580/1978 disclose a method in which magnesium alkoxide is reacted with a titanium compound in the presence of a halogenating agent, a silicon halide or an electron donating compound. Although these methods increase the catalytic activity, the increased activity is still not sufficiently high.

The ultimate object of the aforedescribed methods which have been proposed for the high activity polymerization of ethylene is to omit the catalyst removing step and to simplify the production steps by improving the catalyst activity and at the same time, to increase the quality of the product obtained. It is, therefore, most desirable to increase the catalyst activity to higher levels. In addition, to facilitate handling of the slurry during production of polyethylene, it is desired that the bulk density of the polymer should be maximized, the particle diameter of the powders polymer should be uniform, and the amount of fine particles and of coarse particles should be reduced.

We have now discovered that a solid component, which is produced by pre-treating a magnesium dialkoxide with a specific amount of silicon compound in the presence of alcohol and then reacting the solid material so obtained with titanium halide in the presence of a silicon compound has greatly increased catalytic activity, and that the polymer produced using this catalyst component has excellent bulk density and powder particle size characteristics.

SUMMARY OF THE INVENTION

This invention provides a process for polymerizing ethylene in the presence of a catalyst comprising: (A) a reaction product of a magnesium compound and titanium halide, and (B) an organic aluminum compound, wherein there is employed as Component A a solid material which is produced as follows:

Magnesium dialkoxide is reacted with a halogen-containing silicon compound represented by the formula: $X^1_n Si(OR^1)_{4-n}$ (wherein $X^1$ is a halogen atom, $R^1$ is an alkyl group, and $0 < n \leq 4$) and an alcohol, said halogen-containing silicon compound being present in an amount corresponding to a halogen/magnesium atomic ratio of 1 or less based upon the magnesium dialkoxide, and the resulting material is reacted with titanium halide in the presence of a alkoxy-containing silicon compound represented by the formula: $X^2_{4-m} Si(OR^2)_m$ (wherein $X^2$ is a halogen atom, $R^2$ is an alkyl group, and $0 < m \leq 4$) to provide the solid material.

DETAILED DESCRIPTION OF THE INVENTION

The magnesium dialkoxides which are used in this invention are usually aliphatic or alicyclic dialkoxides containing from 1 to 20 carbon atoms, preferably 1 to 8 carbon atoms, and more preferably 1 to 4 carbon atoms, particularly the methyl and ethyl compounds. Examples of suitable magnesium dialkoxide are magnesium dimethoxide, magnesium diethoxide, magnesium dipropoxide, magnesium dibutoxide, and magnesium dicyclohexoxide. These magnesium dialkoxides can be produced with ease by conventional procedures. These magnesium dialkoxides which have particle diameters of from 1 to 500 microns are usually employed.

Component A of the catalyst which is utilized in the process of this invention is prepared as follows: Usually magnesium dialkoxide is first dispersed in an inert solvent. The amount of magnesium dialkoxide being added is not critical and for convenience of operation is it preferred to add it in an amount of 50 to 500 grams per liter of the solvent.

To this dispersion, a halogen-containing silicon compound represented by the formula: $X^1_n Si(OR^1)_{4-n}$ (wherein $X^1$ is a halogen atom, $R^1$ is an alkyl group, and $0 < n \leq 4$) and an alcohol are added. The resulting mixture is then reacted with stirring at a predetermined temperature for a predetermined time to modify the magnesium dialkoxide. The temperature is usually 0°C. to 150°C., preferably 20°C. to 100°C. The reaction time is usually 5 minutes to 5 hours, preferably 30 minutes to 3 hours, varying dependant upon the reaction temperature.

The order in which the above three components are brought into contact with each other is not limited to the aforedescribed sequence. For example, the components can be contacted with each other in the two stages: that is, magnesium dialkoxide and the halogen-containing silicon compound are first reacted and the alcohol is then added to the resulting reaction mixture.

In the formula: $X^1_n Si(OR^1)_{4-n}$, $X^1$ is a halogen atom, with chlorine and bromine being preferred. $R^1$ is an alkyl group such as methyl group, ethyl group, propyl group and the like, with those alkyl groups containing from 1 to 8 carbon atoms being preferred.

Representative examples of the halogen-containing silicon compound are tetrachlorosilane, tetrabromosilane, trichloromethoxysilane, dichlorodiethoxysilane, etc. They can be used singly or in a mixture with each other.

The halogen-containing silicon compound is added to the magnesium dialkoxide in amounts corresponding to halogen/magnesium atomic ratio of 1 or less, preferably 1/5 to 1, and more preferably 1/2 to 1. When the halogen/magnesium atomic ratio is larger than 1, the amount of fine polyethylene particles (less than 105 μ) is undesirably increased.

Alcohols which can be used in this invention are straight or branched chain aliphatic and alicyclic alcohols, and in particular, primary and secondary alcohols containing from 1 to 8 carbon atoms are preferred. Examples of suitable alcohols are methanol, ethanol, propanol, iso-propanol, butanol, iso-butanol, amyl alcohol, octanol, etc.

The amount of the alcohol added is from 0.1 to 10 moles, preferably from 0.1 to 4 moles based on 1 mole of the magnesium compound. Although the upper limit of the amount is subject to no severe limitation, the use of a large amount of alcohol leads to the waste of the titanium compound as explained later. When the amount of the alcohol added is below the lower limit, the polymerization activity and the bulk density of the polymer is undesirably low.

As the solvent to be used in the above reaction, there can be employed inert solvents which do not react with the above-described magnesium dialkoxide, halogen-containing silicon compound and alcohol: for example, aliphatic hydrocarbon and alicyclic hydrocarbons can be employed. Examples of suitable solvents are butane, pentane, hexane, heptane, cyclohexane, etc.

The above-described reaction wherein the solvent is used is a preferred embodiment of this invention. However, the reaction can be carried out in the absence of solvent. In this case, a predetermined amount of the magnesium dialkoxide, the halogen-containing silicon compound and the alcohol are mixed directly in a mechanical device such as a ball mill.

The thus modified magnesium dialkoxide is used in the subsequent reaction as it is, namely, in the form of a dispersion, or after being elutriated. Alternatively, the modified magnesium dialkoxide may be further treated with an organic aluminum compound and can be used in the subsequent reaction.

The modified magnesium dialkoxide is reacted with titanium halide in the presence of an alkoxy-containing silicon compound of the formula: $X_{4-m}^2Si(OR^2)_m$ to provide Component A of the catalyst of this invention. The compound $X_{4-m}^2Si(OR^2)_m$ may not be added as an additional component because it is already present having been formed in the initial reaction of the magnesium dialkoxide, the compound $X_n^1Si(OR^1)_{4-n}$ and the alcohol, and was not removed from the reaction mixture before the titanium halide was added. When the reaction mixture of the magnesium dialkoxide, silicon compound and alcohol is washed, thereby removing the silicon compound prior to the reaction with the titanium halide, then coaddition of the $X_{4-m}^2Si(OR^2)_m$ compound is required.

In the formula, $X^2$ is halogen atom with chlorine and bromine being preferred. $R^2$ is an alkyl group and in particular those alkyl groups containing from 1 to 8 carbon atoms are preferred. Representative examples of the alkoxy-containing silicon compounds are methoxytrichlorosilane, dimethoxydichlorosilane, trimethoxychlorosilane, tetramethoxysilane, tetraethoxysilane, etc. They can be used singly or in a mixture with each other.

Titanium halides which can be used in this invention are tetravalent, trivalent and divalent halogen-containing titanium compounds. Examples of suitable halogen-containing titanium compounds are $TiBR_4$, $TiCl_4$, $Ti(OR^3)Cl_3$, $Ti(OR^3)_2Cl_2$, $Ti(OR^3)_3Cl$, $TiBr_3$, $TiCl_3$, $TiCl_2$, etc., wherein $R^3$ is alkyl group containing from 1 to 8 carbon atoms.

The reaction of the modified magnesium dialkoxide and the titanium halide in the presence of the alkoxy-containing silicon compound is usually carried out in a hydrocarbon solvent. However, it can be carried out in the absence of solvent.

When the reaction is carried out in a solvent and when the modified magnesium dialkoxide produced in the presence of the solvent is used as it is without being isolated from the reaction mixture, a predetermined amount of titanium halide is added to the reaction mixture since it already contains the silicon compound (in the foregoing stage, $X_n^1Si(OR^1)_{4-n}$ has been converted into $X_{4-m}^2Si(OR^2)_m$) and when the modified magnesium dialkoxide is isolated from the reaction mixture and the silicon compound washed away, said modified magnesium dialkoxide is again dispersed in an inert solvent and then predetermined amounts of a silicon compound $X_{4-n}^2Si(OR^2)_n$ and the titanium halide are added thereto. Thereafter, the mixture is reacted with stirring at ambient pressure or under pressure at a temperature of from 0° to 200° C., preferably from 50° C. to 150° C. The reaction time, although it varies depending upon the reaction temperature, is usually from 5 minutes to 10 hours, preferably from 30 minutes to 5 hours.

When the reaction is carried out in the absence of a solvent, the reactants are mechanically mixed by using a device such as a ball mill at the above temperature for the above reaction time.

In this reaction, the amount of the silicon compound used is preferably 0.05 mole or more based on 1 mole of the magnesium dialkoxide used as a starting material. The addition of the silicon compound in a lesser amount results in an undesirable lowering of the bulk density of the produced polyethylene.

The titanium halide is added in an equimolar amount or more based on 1 mole of the magnesium dialkoxide used as the starting material, and is preferably in an amount in excess of said equimolar amount. In particular, the amount of the titanium halide added is from 1 to 20 moles, preferably from 1.5 to 10 moles based on 1 mole of the modified magnesium dialkoxide.

After the above reaction is completed, the solid components are elutriated from the reaction mixture. In this elutriation, an inert hydrocarbon solvent containing from 5 to 10 carbon atoms, such as pentane, hexane, cyclohexane, heptane, etc. is employed.

The thus elutriated solid material may be used as it is or may be dispersed in an inert hydrocarbon solvent in a specific concentration in an inert atmosphere to provide a catalyst component.

When dispersing the washed solid material in the inert hydrocarbon, it may be dispersed after being further treated with an organic aluminum compound. This treatment further increases the polymerization activity of the catalyst and increases the bulk density of the product polyethylene. The organic aluminum compound used in this treatment may be the same as or different from the organic aluminum compound used as Component B as hereinafter explained. The organic aluminum compound is used in an amount substantially equal to or in excess of the amount of the supported titanium.

In the process of this invention, ethylene is polymerized in the presence of a catalyst comprising:

(A) the reaction product of the modified magnesium dialkoxide, the silicon compound and the titanium halide, and (B) an organic aluminun compound.

When polymerizing ethylene, Component B and a dispersion of Component A are added to the reaction system as a catalyst. Ethylene is then introduced into the system. The polymerization method, the polymerization conditions, etc. are not subject to any special limitations. Solution polymerization, suspension polymerization, gaseous polymerization and the like can be employed and can be carried out continuously or discontinuously (batchwise).

With reference to the amount of catalyst added, when using solution polymerization or suspension polymerization, for example, Component A is added so that the titanium atom is in an amount of 0.0005 to 10 millimoles/liter, preferably 0.001 to 1 millimole/liter, and Component B is added so that the Al/Ti atomic ratio is between about 5 and 1000, preferably 15 to 200.

The ethylene pressure in the reaction system is usually from ambient pressure to 100 Kg/cm$^2$, preferably 5 to 50 Kg/cm$^2$, the reaction temperature is usually from 20 to 200° C., preferably from 50 to 150° C., and the reaction time is usually from 5 minutes to 10 hours, preferably from 30 minutes to 5 hours. The control of the molecular weight of the polymer can be achieved to a certain extent by determining such polymerization conditions as temperature, concentration of catalyst and a proper molar ratio of the catalyst, further it can effectively be carried out in the presence of hydrogen.

Organic aluminum compounds which may be employed as Component B of the catalyst used in this invention are not limited. Organic aluminum compounds represented by the formula: $R'_3Al$, $R'_2AlX$, $R'_3Al_2X_3$ and $R'_2AlOR''$ (wherein R' and R" are alkyl groups containing from 1 to 6 carbon atoms or aryl groups, and X is a halogen atom) are preferably employed. Representative examples of such organic aluminum compounds are trimethylaluminum, triethylaluminum, triisopropylaluminum, triisobutylaluminum, diethylaluminum monochloride, diisopropylaluminum monochloride, diisobutylaluminum monochloride, diethylaluminum monoethoxide, ethylaluminum sesquichloride, etc.

In the process of this invention, the polymerization of ethylene includes homopolymerization of ethylene and copolymerization of ethylene with a small amount (usually up to about 5% by weight) of an α-olefin, such as propylene, butene-1 and hexene-1.

The catalyst employed in this invention can further contain an organic metal compound such as an organic zinc compound.

In accordance with the process of this invention, the polymerization activity is increased and the bulk density is markedly increased compared to polyethylene produced by the prior art method. In addition, when the halogen-containing silicon compound is added in the modification of the magnesium dialkoxide in an amount such that the halogen/magnesium atomic ratio is 1 or less, the particle size of the polyethylene powder is more uniform and the amount of fine (less than 105μ) polyethylene particles is reduced.

Although the reason why such excellent catalyst activity is obtained is not clear, it is considered that the modified product obtained by the complicated reaction of the halogen-containing silicon compound, the alcohol and the magnesium dialkoxide contributes to the excellent catalyst activity. In addition, it is considered that the limited amount of halogen in said halogen-containing silicon compound contributes greatly to the improvement in the particle size distribution of the polymer to be formed. This invention, however, is not limited by this theoretical consideration.

When the titanium is supported on the aforedescribed modified product in the presence of the alkoxy-containing silicon compound, the polymerization activity and the production of polyethylene having high bulk density is increased, as explained in the Examples.

According to the process of this invention, it is possible to produce high density polyethylene very efficiently and economically.

The following Examples and Comparative Examples are given to explain this invention in greater detail.

EXAMPLES 1-19

(1) Production of Catalyst Component A 10.0 Grams (88 millimoles) of $Mg(OC_2H_5)_2$ was dispersed in 150 milliliters of n-heptane, and a halogen-containing silicon compound and an alcohol were added at room temperature in the amount reported in Table 1. After elevating the temperature to 80° C., the above dispersion was reacted for 2 hours. Then, 25 milliliters of $TiCl_4$ was added to the dispersion and further reacted for 3 hours at a temperature of about 100° C. After being cooled, the dispersion was washed with n-heptane until no free chlorine ion was detected. Finally, 2 liters of n-heptane was added to provide a suspension of Component A. The content of titanium in this suspension is shown in Table 1. Before the addition of $TiCl_4$, the existence of alkoxy-containing silicon compound in the reaction system was confirmed by a proton NMR and $13_C$- NMR analysis. Said silicon compound seems to be formed by the reaction of halogen-containing compound with $Mg(OC_2H_5)_2$ and/or alcohol.

(2) Polymerization of Ethylene 400 milliliters of hexane, 2.0 millimoles of triethylaluminum and Component A obtained above in the amount reported in Table 1 (expressed in the weight of titanium atom) were charged to a one liter autoclave with a polymerization of ethylene was carried out with a hydrogen pressure of 3 Kg/cm$^2$ and an ethylene pressure of 5 Kg/cm$^2$, at 80° C. for 1 hour while the inside pressure was maintained constant by continuously feeding ethylene.

The catalyst activity per gram of titanium, and the melt index, the bulk density and the particle size of the polyethylene obtained are reported in Table 1.

COMPARATIVE EXAMPLES 1 to 3

The procedure of Example 1 was repeated to produce various catalysts wherein the reaction was carried out in the absence of ethanol and the amount of added $SiCl_4$ was changed. By use of the thus obtained catalyst polymerization was carried out. The results are reported in Table 1.

By comparing the results of the Examples and Comparative Examples, it can readily be seen that the process of this invention is excellent in improving the polymerization activity and/or bulk density of polyethylene.

COMPARATIVE EXAMPLE 4

The procedure of Example 5 was repeated except that $SiCl_4$ was added in an amount of 0.5 (molar ratio) based on 1 mole of $Mg(OC_2H_5)_2$. The results are reported in Table 1.

COMPARATIVE EXAMPLE 5

The procedure of Example 7 was repeated except that $SiCl_4$ was added in an amount of 0.5 (molar ratio) based on 1 mole of $Mg(OC_2H_5)_2$. The results are reported in Table 1.

EXAMPLE 20

Using the same amounts of ethanol and $SiCl_4$ as used in Example 4, $Mg(OC_2H_5)_2$ and $SiCl_4$ were first reacted at 80° C. for 30 minutes. To this reaction solution, ethanol was added and the resulting mixture was reacted at 80° C. for 1 hour. After addition of 25 millimiters of $TiCl_4$, the reaction solution was further reacted at 100° C. for 3 hours to provide Component A of the catalyst. With this catalyst component, the polymerization of ethylene was carried out at the same conditions as Example 4. The amount of the titanium supported in Component A was 30 milligrams per gram of carrier.

The polymerization activity was 365 Kg/hour per gram of titanium atom, the melt index of the polyethylene obtained was 0.89 (g/10 min.) and the bulk density was 0.27 gram per milliliter (g/ml). Those polyethylene particles having particle diameters of less than $105\mu$ was 4.5%.

EXAMPLE 21

To the catalyst prepared in Example 5, $(C_2H_5)_3Al_2Cl_3$ was added at 0° C. in an amount equimolar to the supported titanium and reacted for 1 hour. Thereafter the reaction mixture was treated at 40° C. for 4 hours and washed to provide a new catalyst. In this catalyst, the amount of the titanium supported was 43 milligrams per gram of carrier.

Using the thus obtained catalyst, the polymerization of ethylene was carried out under the same conditions as in EXAMPLE 5.

The polymerization activity was 353 Kg/hour per gram of titanium atom, the melt indix of the polyethylene obtained was 1.2 (g/10 min.), and the bulk density was 0.33 g/ml. Those polyethylene particles having particle diameters of less than $105\mu$ was 1.8%.

It can be seen that the further treatment of Component A with an organic aluminum compound further improves the polymerization activity and further increases the bulk density of polyethylene.

EXAMPLE 22

Using $SiCl_4$ and the alcohol in the same ratio as in Example 5, magnesium diethoxide, $SiCl_4$ and ethanol were reacted and then washed three times with 200 milliliters of n-heptane. The thus obtained solids were dried under pressure at 120° C. for 1 hour and dispersed in 150 milliliters of n-heptane. To this dispersion, 44 millimoles of $Si(OC_2H_5)_4$ and 25 milliliters of $TiCl_4$ were added and reacted at 100° C. for 3 hours to provide a catalyst. The amount of the supported titanium was 26 milligrams per gram of carrier.

The polymerization activity was 320 Kg/hour per gram of titanium atom, the melt index of the polyethylene product was 0.9 (g/10 min.) and the bulk density was 0.31 g/ml. Those polyethylene particles having particle diameters of less than $105\mu$ was 2.5%.

COMPARATIVE EXAMPLE 6

The procedure of Example 1 was repeated except that no $SiCl_4$ and ethanol were added. The results are shown in Table 1.

COMPARATIVE EXAMPLE 7

88 Millimoles of $Mg(OC_2H_5)_2$, 11 millimoles of $SiCl_4$ and 25 milliliters of $TiCl_4$ were mixed at the same time, reacted at 80° C. for 2 hours, and further reacted at 100° C. for 3 hours to provide a catalyst. With this catalyst, polymerization of ethylene was carried out. The results are reported in Table 1.

COMPARATIVE EXAMPLE 8

The solid component obtained by reaction $Mg(OC_2H_5)_2$, $SiCl_4$ and ethanol in Example 4 was washed three times with n-heptane and again dispersed in n-heptane. To this dispersion, 25 milliliters of $TiCl_4$ was added, and the resulting mixture was reacted and polymerization of ethylene was carried out. The results are reported in Table 1.

COMPARATIVE EXAMPLE 9

$Mg(OC_2H_5)_2$, $SiCl_4$, ethanol and $TiCl_4$ were mixed at the same time in the same ratio as in Example 4 to provide a catalyst. With this catalyst, polymerization of ethylene was carried out. The results are reported in Table 1.

EXAMPLE 23

The procedure of Example 2 was repeated except that $Mg(OCH_3)_2$ was used in place of $Mg(OC_2H_5)_2$. The amount of supported titanium in Component A was 23 milligrams per gram of carrier.

The polymerization activity was 101 Kg/hour per gram of titanium atom, the melt index of the polyethylene obtained was 1.2 (g/10 min.), and the bulk density was 0.23 g/ml. Those polyethylene particles having particle diameters of less than $105\mu$ was 10.5%.

TABLE 1

| | Catalyst Preparation Conditions | | | | Amount of Titanium supported *2 | Amount of Catalyst used | | Polymerization Activity *4 | Properties of Polyethylene | | | |
|---|---|---|---|---|---|---|---|---|---|---|---|---|
| | Halogen-containing Silicon Compound | | Alcohol | | | Triethyl- Aluminum (millimole) | Titanium Component *3 | | Melt Index (g/10 min.) | Bulk Density (g/ml) | Particle Diameter | |
| Ex.No. | Kind | Amount *1 | Kind | Amount *1 | | | | | | | <$105\mu$ | $1000\mu$< |
| Ex. 1 | $SiCl_4$ | 0.063 | ethanol | 0.25 | 67 | 2 | 0.01 | 90 | 1.2 | 0.20 | 2.8 | 18.9 |
| 2 | " | 0.10 | " | 0.10 | 93 | " | " | 200 | 1.2 | 0.25 | 7.0 | 1.8 |
| 3 | " | 0.125 | " | 0.25 | 32 | " | " | 252 | 0.98 | 0.26 | 3.0 | 2.5 |
| 4 | " | " | " | 0.50 | 37 | " | " | 340 | 1.03 | 0.31 | 2.5 | 1.9 |
| 5 | " | " | " | 1.0 | 51 | " | " | 272 | 0.92 | 0.29 | 3.5 | 1.9 |
| 6 | " | " | " | 1.5 | 48 | " | " | 266 | 1.0 | 0.29 | 8.9 | 1.5 |
| 7 | " | " | " | 2.0 | 22 | " | " | 253 | 1.5 | 0.29 | 10.3 | 1.1 |
| 8 | " | 0.25 | " | 0.50 | 52 | " | " | 298 | 1.6 | 0.28 | 5.8 | 2.0 |

TABLE 1-continued

| | Catalyst Preparation Conditions | | | | Amount of Titanium supported *2 | Amount of Catalyst used | | Polymerization Activity *4 | Properties of Polyethylene | | | |
|---|---|---|---|---|---|---|---|---|---|---|---|---|
| | Halogen-containing Silicon Compound | | Alcohol | | | Triethyl-Aluminum (millimole) | Titanium Component *3 | | Melt Index (g/10 min.) | Bulk Density (g/ml) | Particle Diameter | |
| Ex.No. | Kind | Amount *1 | Kind | Amount *1 | | | | | | | <105μ | 1000μ< |
| 9 | " | " | " | 4.0 | 41 | " | " | 281 | 2.1 | 0.28 | 8.3 | 1.5 |
| 10 | " | " | " | 8.0 | 17 | " | " | 160 | 1.8 | 0.21 | 10.4 | 2.3 |
| 11 | " | 0.125 | iso-propanol | 0.25 | 78 | " | " | 240 | 2.9 | 0.32 | 4.3 | 2.5 |
| 12 | " | " | iso-propanol | 0.50 | 71 | " | " | 220 | 3.2 | 0.29 | 6.1 | 3.0 |
| 13 | " | " | n-propanol | " | 36 | " | " | 290 | 1.3 | 0.33 | 5.5 | 1.0 |
| 14 | " | 0.25 | n-butanol | " | 35 | " | " | 290 | 1.6 | 0.30 | 6.5 | 1.7 |
| 15 | " | " | n-octanol | " | 70 | " | " | 240 | 1.3 | 0.30 | 8.6 | 2.0 |
| 16 | " | " | cyclo-hexanol | " | 80 | " | " | 350 | 2.0 | 0.30 | 7.6 | 1.8 |
| 17 | $Si(OC_2H_5)_2Cl_2$ | " | ethanol | " | 34 | " | " | 255 | 1.2 | 0.26 | 7.5 | 0.8 |
| 18 | $Si(OC_2H_5)_3Cl$ | 0.25 | ethanol | 0.50 | 29 | 2 | 0.01 | 198 | 1.9 | 0.27 | 9.0 | 0.5 |
| 19 | $Si(OC_2H_5)Cl_3$ | 0.125 | " | " | 42 | " | " | 235 | 1.4 | 0.26 | 4.8 | 3.9 |
| *8 C.Ex.1 | $SiCl_4$ | 0.063 | — | — | 176 | 2 | 0.01 | 94 | 6.5 | 0.14 | 28.0 | 2.5 |
| 2 | " | 0.125 | — | — | 173 | " | " | 133 | 7.2 | 0.21 | 25.0 | 4.5 |
| 3 | " | 0.25 | — | — | 90 | " | " | 156 | 1.3 | 0.17 | 20.0 | 3.9 |
| 4 | " | 0.50 | ethanol | 1.0 | 55 | " | " | 225 | 1.9 | 0.25 | 38.0 | 3.0 |
| 5 | " | " | " | 2.0 | 58 | " | " | 325 | 1.6 | 0.33 | 45.0 | 2.0 |
| 6 | — | — | — | — | 206 | " | 0.1 | 20 | 0.65 | 0.21 | 3.0 | 74.0 |
| 7 | $SiCl_4$*5 | 0.125 | — | — | 220 | " | " | 13 | 0.56 | 0.18 | 40.0 | 5.5 |
| 8 | "*6 | " | ethanol | 0.50 | 89 | " | 0.01 | 150 | 3.2 | 0.22 | 50.5 | 3.0 |
| 9 | "*7 | " | " | " | 98 | " | " | 83 | 1.5 | 0.17 | 44.6 | 2.5 |

Note:
*1 Molar ratio of halogen-containing silicon compound or alcohol to $Mg(OC_2H_5)_2$
*2 Unit: mg Ti/g Carrier
*3 Unit: millimoles of titanium atom
*4 Unit: Yield of polyethylene (Kg) per gram of titanium atom per hour
*5 $Mg(OC_2H_5)_2$, $SiCl_4$ and $TiCl_4$ were treated at the same time.
*6 $SiCl_4$ and ethanol were reacted, washed and then reacted with $TiCl_4$.
*7 $SiCl_4$, ethanol, $TiCl_4$ and $Mg(OC_2H_5)_2$ were reacted at the same time.
*8 Comparative Examples

What is claimed is:

1. In a process for polymerizing ethylene in the presence of a catalyst comprising (A) a reaction product of magnesium compound and titanium halide and (B) an organic aluminum compound, the improvement characterized in that there is employed as Component A a solid material, which is produced by the process comprising reacting magnesium dialkoxide with a halogen-containing silicon compound of the formula $X_n^1Si(OR^1)_{4-n}$ wherein $X^1$ is a halogen atom, $R^1$ is an alkyl group, and $0<n\leq 4$, and an alcohol to form a modified magnesium dialkoxide, said alcohol being in an amount of from 0.1 to 10 moles per mole of said magnesium dialkoxide, said halogen-containing silicon compound being in an amount to provide a halogen/magnesium atomic ratio of 1 or less, and reacting said modified magnesium dialkoxide with a titanium halide in the presence of an alkoxy-containing silicon compound of the formula: $X_{4-m}^2Si(OR^2)_m$ wherein $X^2$ is a halogen atom, $R^2$ is an alkyl group, and $0<m\leq 4$, to form said solid material.

2. The process of claim 1 wherein said magnesium dialkoxide contains between 1 and 20 carbon atoms in each alkoxide group, wherein said alcohol is a straight-chain or branched-chain aliphatic alcohol or an alicyclic alcohol containing up to 8 carbon atoms; and wherein $R^1$ and $R^2$ are alkyl groups containing from 1 to 8 carbon atoms.

3. The process of claim 2 wherein said alcohol is in an amount of between 0.1 and 4 moles per mole of said magnesium dialkoxide.

4. The process of claim 2 or claim 3 wherein said halogen-containing silicon compound is in an amount to provide said halogen/magnesium atomic ratio of between 1/5 and 1.

5. The process of claim 1 wherein said halogen-containing silicon compound is in an amount to provide said halogen/magnesium atomic ratio of between 1/5 and 1.

6. The process of claim 1 wherein said titanium halide is in an amount of from 1 to 20 moles per mole of the magnesium dialkoxide.

7. The process of claim 1 wherein said titanium halide is in an amount of from 1.5 to 10 moles per mole of the magnesium dialkoxide.

* * * * *